(No Model.)
F. STALDER.
WAGON BRAKE.
No. 324,045. Patented Aug. 11, 1885.
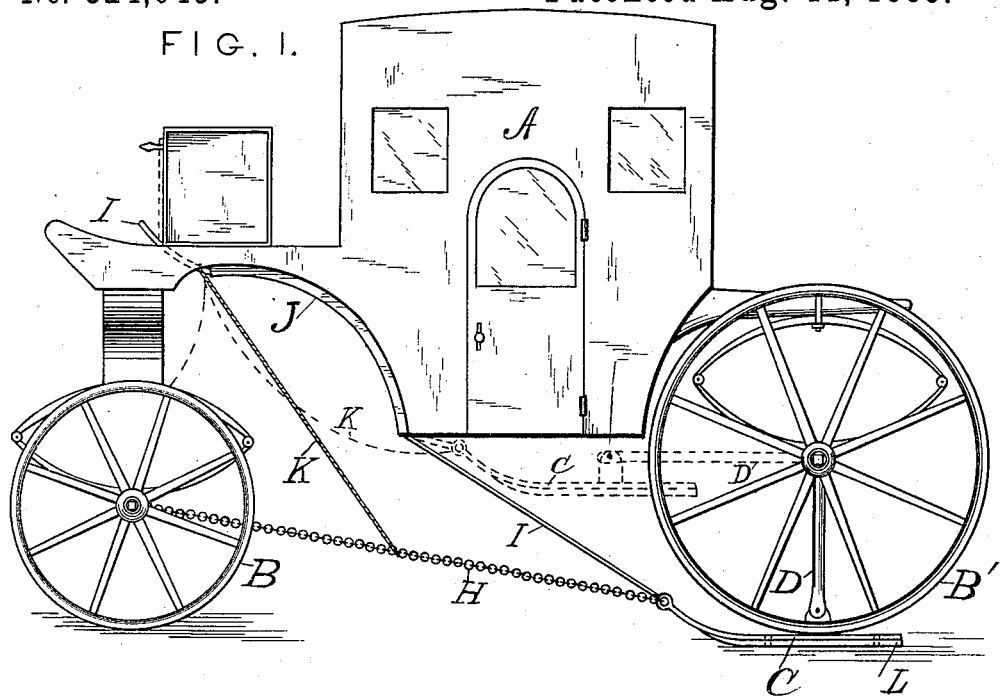
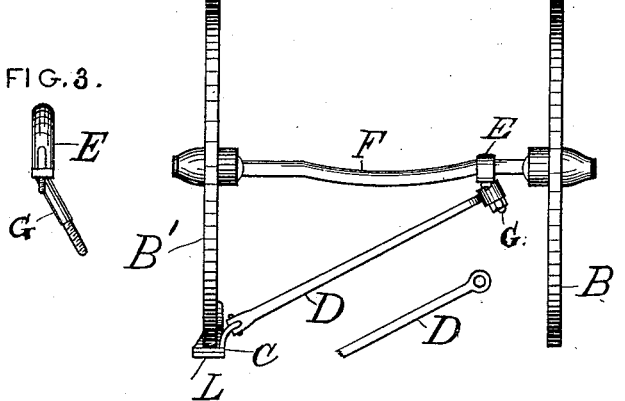
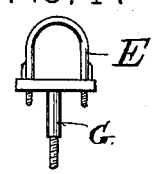
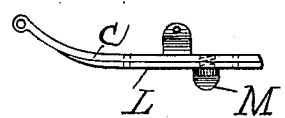
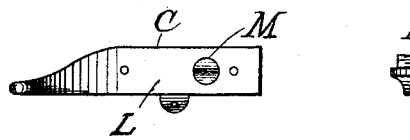
Witnesses:
Percy White.
W. E. Oughinbaugh.
Inventor:
Fredrick Stalder,
by John J. Halsted & Son, his Attys

UNITED STATES PATENT OFFICE.

FREDRICK STALDER, OF ALLEGHENY CITY, PENNSYLVANIA.

WAGON-BRAKE.

SPECIFICATION forming part of Letters Patent No. 324,045, dated August 11, 1885.

Application filed January 24, 1885. (No model.)

*To all whom it may concern:*

Be it known that I, FREDRICK STALDER, of Allegheny City, in the county of Allegheny and State of Pennsylvania, have invented certain new and useful Improvements in Wagon Brakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of wagon or carriage brakes known as "drag-brakes;" and it consists in a special construction and combination of devices now to be described.

In the drawings, Figure 1 is a side view of a carriage and of the brake embodying my invention applied thereto. Fig. 2 is a back view of the brake clipped to the axle; Fig. 3, an edge view of the clip; Fig. 4, a side view of the clip. Fig. 5 is a side view of the shoe, showing a pin affixed thereon. Fig. 6 is an under side view of such shoe.

A indicates the body of a carriage, which may be of any known construction, as my invention is applicable to vehicles in general. B B' are the wheels. C is the brake or brake-shoe, which is pivoted or swiveled to a metal rod or bar, D, which is also pivoted or swiveled at its other end to one side of the center of the axle, as shown, by means of an appropriate clip or fastening, E, on the axle F. The pivotal pin or center G of the clip is inclined, as shown, at such an angle that when the bar D is not held up, but is left free to drop by its own gravity, it will automatically swing or carry the brake-shoe C to its place directly in line in front of the wheel B', which is at that side of the vehicle opposite the side at which the rod D is hung.

To guide and to properly position the shoe when lowered relatively to the wheel, the toe of the shoe is connected to a chain or cord, H, which is fastened to the forward axle, and this chain is so adjusted as to its length that when fully let out the shoe will drag far enough behind the front axle to permit the wheel B' to pass up and on it, substantially as shown in Fig. 1, so that this wheel can no longer revolve, and the drag-brake shall come into operation between such wheel and the ground, thus not only acting as a very efficient brake, but also saving the wheel from those damaging strains which are always incident to chaining the wheel, or to applying a brake to a wheel which continues to rest on the ground and to revolve more or less.

The means for raising and lowering the brake are as follows: A leather or other strap, I, connected to the upturned toe of the shoe, passes through any suitable guide, guides, or guideways, (dependent on the form of the carriage body)—as, for instance, as is shown at J—and thence to any convenient point within the reach of the driver, where it may be hung to the seat. This guiding of the strap saves it from coming in contact with the front wheels.

K is a cord or strap connecting the chain with the strap I, and serving to take up the slack of the chain when the shoe is lifted up out of use, in which case the shoe is swung around away from the wheel B', and with its supporting-rod D raised up out of the way to a place about underneath the middle of the vehicle. This strap may be held up by hanging it on a pin upon the driver's seat.

After using the brake, the vehicle is pushed back a little way to release the brake, which is then pulled up by the leather strap, as above stated.

The shoe is preferably made with a sole, L, as shown, the lower face of which may be roughened in any desired way to increase its resistance when in use.

For winter-time, when ice and snow cover the roads, I place a pin, M, in the shoe, so that it shall project beneath the shoe-bottom, and as a simple way of attaching it securely I provide a thread on the pin adapted for a threaded hole in the shoe.

The sole may be bolted to the shoe, substantially as shown.

I claim—

1. In combination with the swing-lever D, hung to the axle near one wheel, and provided with a brake-shoe, C, adapted to be swung down to come under the opposite wheel, the lifting-strap I, attached to the forward end or toe of the shoe, and a central guide for the strap, such strap and guide serving to raise the lever and the shoe to substantially a horizontal position midway between the wheels, 2. In combination, the lever D, hung on the axle in the position described, the shoe C, the strap I, connected to its forward end or toe, and the adjusting chain or cord H, all operating substantially as described.

3. In combination, the lever D, the shoe C, strap I, and chain or cord H, both attached to the toe of the shoe, and the strap or cord K, connecting the strap I to the chain H, all as and for the purposes set forth.

4. In combination with the brake-shoe C, arranged to be held up beneath the center of the carriage and to be let down to come under one wheel of the carriage, the threaded and removable pin M and a threaded hole in the shoe for the same, all substantially as shown and described.

FREDRICK STALDER.

Witnesses:
EDWARD ENGELMAN,
CHAS. TRAUTMAN.